(12) United States Patent
Ashmore et al.

(10) Patent No.: US 9,194,429 B2
(45) Date of Patent: Nov. 24, 2015

(54) BEARING CAGE DEFLECTOR

(71) Applicant: ROLLS-ROYCE PLC, London (GB)

(72) Inventors: Daren Richard Ashmore, Nottingham (GB); James Alan Plant, Nottingham (GB); Steven Opacic, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/332,639

(22) Filed: Jul. 16, 2014

(65) Prior Publication Data

US 2015/0043861 A1 Feb. 12, 2015

(30) Foreign Application Priority Data

Aug. 6, 2013 (GB) .................................. 1314049.6

(51) Int. Cl.
F16C 33/46 (2006.01)
F16C 33/38 (2006.01)
F16C 33/78 (2006.01)

(52) U.S. Cl.
CPC ................. F16C 33/38 (2013.01); F16C 33/46 (2013.01); F16C 33/7823 (2013.01); F16C 33/7893 (2013.01); F16C 33/385 (2013.01); F16C 33/4629 (2013.01)

(58) Field of Classification Search
CPC ...... F16C 33/38; F16C 33/46; F16C 33/4629; F16C 33/385; F16C 33/7893; F16C 33/7823
USPC ........... 384/99, 462, 465–466, 470–474, 490, 384/506, 523, 572, 601, 607, 621–623, 586
See application file for complete search history.

(56) References Cited

U.S. PATENT DOCUMENTS

| | | | | |
|---|---|---|---|---|
| 2,838,348 A | * | 6/1958 | Hamm | 384/466 |
| 3,243,243 A | * | 3/1966 | Diver et al. | 384/465 |
| 4,345,799 A | * | 8/1982 | Crofts | 384/470 |
| 4,693,616 A | * | 9/1987 | Rohra et al. | 384/99 |
| 6,431,756 B2 | * | 8/2002 | Maquire et al. | 384/99 |
| 8,292,511 B2 | * | 10/2012 | Gibbons | 384/462 |
| 8,529,135 B2 | * | 9/2013 | Duffy et al. | 384/470 |

(Continued)

FOREIGN PATENT DOCUMENTS

DE 102010047927 A1 4/2011
EP 0 692 648 A2 1/1996

(Continued)

OTHER PUBLICATIONS

United Kingdom Search Report issued United Kingdom Application No. GB1314049.6 issued Feb. 6, 2014.

(Continued)

*Primary Examiner* — Marcus Charles
(74) *Attorney, Agent, or Firm* — Oliff PLC

(57) ABSTRACT

A bearing cage for a rolling element bearing assembly, the bearing cage including a cage body having an inner surface defining a bore coaxially aligned with the principal rotational axis of the bearing cage; a plurality of pockets, each pocket being suitable for housing a rolling element of the rolling element bearing assembly, the pockets being arranged sequentially around the cage body with respect to the principal rotational axis of the bearing cage; and a skirt projecting from the cage body in the axial direction; characterized by a flow deflector projecting from the skirt in the radial direction.

14 Claims, 3 Drawing Sheets

(56) References Cited

U.S. PATENT DOCUMENTS

| | | |
|---|---|---|
| 2006/0193545 A1* | 8/2006 | Bridges et al. .............. 384/470 |
| 2008/0193070 A1 | 8/2008 | Beluffi et al. |
| 2013/0108202 A1 | 5/2013 | Do et al. |

FOREIGN PATENT DOCUMENTS

| | | | |
|---|---|---|---|
| EP | 2479446 A2 | 7/2012 | |
| FR | 2469606 A1 * | 5/1981 | .............. F16C 19/16 |
| FR | 2 548 297 A1 | 1/1985 | |
| FR | 2882116 A1 | 8/2006 | |
| FR | 2929358 A1 | 10/2009 | |
| GB | 144259 A * | 4/1921 | .............. B64D 13/02 |
| GB | 931581 A * | 7/1963 | .............. F16C 27/04 |
| GB | 936213 | 9/1963 | |

OTHER PUBLICATIONS

Mar. 4, 2015 Search Report issued in European Application No. 14176993.

* cited by examiner

BEARING CAGE DEFLECTOR

FIELD OF THE INVENTION

The present invention relates to bearing cages providing improved protection for the working contacts of bearings, in particular bearings in gas turbine engines.

BACKGROUND OF THE INVENTION

A gas turbine engine includes an engine outer structure, which is essentially a pressure vessel that contains hot, flowing air, and support structures for the rotating elements of the engine, which extend through the pressure vessel in order to support the rotating elements whilst still allowing air to pass from the front to rear of the engine.

Generally, the support structures are circular when viewed along the axis of the engine, with a number of struts or vanes joining inner and outer rings and a bearing chamber located in the middle. Inside the bearing housings, the bearings allow free rotation, yet precise centring, of the rotating elements of the engine such as drive shafts.

The bearing chamber provides a favourable environment for the bearings to operate reliably. For example, inside the chamber, nozzles are provided to distribute lubricant to the bearings. To prevent lubricant leaking out of the bearing chamber, and to prevent the ingress to the chamber of excess hot air, the bearing chamber is separated from the surrounding environment by seals. In use, the air pressure in the environment surrounding the bearing chamber is at a higher pressure than inside the chamber, and typically gas flows in to the chamber through the seals. Thus the seals may be provided in the form of labyrinth seals, for example. This inward flow of air prevents oil from migrating in the opposite direction out of the bearing chamber through the seal.

However, this arrangement can be disadvantageous. For example, the inward flow of gas may bring with it unwanted detritus, debris and/or other undesirable contaminants, which could adversely affect the operation of the bearings.

Furthermore, the incoming gas may be of a sufficiently high temperature to create an axial thermal gradient across the bearing. This may cause the bearing cage to warp, e.g. to cone, and may result in dynamic cage instability of the bearing.

It may also cause a temperature rise in the lubricant (oil) in the bearing, potentially leading to degradation of the lubricant and thus to bearing damage. Indeed, lubricant is typically scavenged from the bearing and reused elsewhere in the engine, thus degraded lubricant could have adverse effects elsewhere in the engine.

The architecture of the engine will often dictate when a bearing and a seal are in axial alignment, or are close to axial alignment. In such an alignment, the typical route of the gas flow from the seal is against the direction of lubricant flowing from the bearing, and this impact of lubricant (in particular, oil) and gas (in particular, air) may cause local disruption to the oil/air flow and increase the temperature of the oil in the bearing chamber, leading to similar disadvantages as those described above.

SUMMARY OF THE INVENTION

The present invention has been devised in view of at least these problems/disadvantages.

Therefore, the present invention provides a bearing assembly according to the appended claims.

A bearing cage for the bearing assembly includes: a cage body having an inner surface defining a bore having an axis arranged coaxially with the principal rotational axis of the bearing cage; a plurality of pockets, each pocket being suitable for housing a rolling element of the rolling element bearing assembly, the pockets being arranged sequentially around the cage body with respect to the principal rotational axis of the bearing cage; a skirt projecting from the cage body in the axial direction; and a flow deflector projecting from the skirt in the radial direction.

Thus, when installed in a rolling element bearing assembly the flow deflector can prevent debris or undesirably hot gases present in the surrounding environment from entering the assembly.

Preferably, the flow deflector extends circumferentially entirely around the skirt.

Respective skirts may be provided to project from the cage body in opposite axial directions, a respective flow deflector projecting from each skirt in the radial direction. Thus, the assembly can be protected from debris in both axial directions.

The or each flow deflector preferably projects outwardly from the principal rotational axis of the bearing cage in the radial direction. This arrangement is of particular benefit when the bearing cage is an inner piloted bearing cage. Thus, the inner surface of the bearing cage defining the bore may provide the pilot surface of the bearing cage.

However, the or each flow deflector may project inwardly towards the axis of the bore in the radial direction, for example when the bearing cage is an outer piloted bearing cage. This arrangement is of particular benefit when the bearing cage is an outer piloted bearing cage. Thus, the outer surface of the bearing cage defining the bore may provide the pilot surface of the bearing cage.

The or each flow deflector preferably includes an outwardly facing deflector face, the deflector face being shaped, along its length (extent) of projection in the radial direction, to extend in the axial direction towards the cage body. Thus, the deflector face may be angled towards the cage body. Shaping the deflector face is beneficial in order to reduce the turbulence in the gas flow.

The deflector face, along its length (extent) of projection in the radial direction, may be formed to include a compound angle, or a plurality of compound angles.

The deflector face may be curved along at least a portion its length (extent) of projection in the radial direction, e.g. to provide a smooth deflection, or re-direction, of the gas.

The deflector face may be curved along its length (extent) of projection, in the radial direction, such that the closest region of the deflector face to the cage body is formed in an intermediate region along the length (extent) of projection of the deflector face. Thus, the deflector face may, in addition to deflecting (or re-directing) the gas radially away from the bearing cage, deflect (or re-direct) the gas axially away from the bearing cage.

Preferably, each respective skirt extends circumferentially entirely around the principal rotational axis of the bearing cage. Preferably, each flow deflector extends circumferentially entirely around a respective skirt.

Any of the features of this first aspect of the invention may be incorporated into any of the other aspects described herein; in particular, into the following aspect(s).

The present invention provides a bearing arrangement including: a rolling element bearing assembly including a bearing cage having a cage body having an inner surface defining a bore coaxially aligned with the principal rotational axis of the bearing cage, a plurality of pockets, each pocket housing a rotatable rolling element of the rolling element bearing assembly, the pockets being arranged sequentially around the cage body with respect to the principal rotational axis of the bearing cage, and a skirt projecting from the cage body in the axial direction; a first body located in the bore of the bearing cage and coaxially aligned with the principal rotational axis of the bearing cage, and arranged to engage each of the rolling elements; a second body arranged circumferentially around the bearing cage to engage the rolling elements, the first and second bodies being rotatable with respect to one another about the principal rotational axis of the bearing cage; and a bearing chamber arranged to house the rolling element bearing assembly, the bearing chamber providing a source of gas flow into the bearing chamber; characterized in that the bearing cage includes a flow deflector projecting from the skirt in the radial direction, for deflecting the gas flow away from the cage body.

Thus, the present invention provides a bearing arrangement in which a gas flow, potentially containing debris or other undesirable contaminants, is deflected away from a rolling element bearing assembly so as to prevent undesirably hot gases, debris and/or other contaminants from entering the bearing assembly.

In other words, the flow deflectors re-direct the gas flow from the source of the gas flow (e.g. the seal adjacent the bearing assembly) which results in a reduction in risk of debris entering the working contacts of the bearing. This therefore reduces the risk of the bearing suffering premature damage and failure. Consequently, the robustness of the bearing to its operational environment will be improved, leading to an improvement in reliability.

The or each flow deflector preferably projects outwardly from the principal rotational axis of the bearing cage in the radial direction. This arrangement is of particular benefit when the bearing cage is an inner piloted bearing cage. Thus, the inner surface of the bearing cage defining the bore may provide a pilot surface for engagement with the first body.

Preferably, the flow deflector intercepts the gas flow between the source and the cage body.

Preferably, the flow deflector is arranged to block the direct line of sight between the source and the cage body.

The source of gas flow is preferably a seal, e.g. provided to seal the bearing chamber; for example, to prevent the outflow of gases or fluids from the bearing chamber. Preferably, the seal is located adjacent the bearing cage, e.g. in the direction of the axis of the bore and/or the direction of the principal axis of rotation of the bearing cage. The seal is preferably configured to permit gas to flow into the bearing chamber when the gas pressure on the external side of the seal exceeds the gas pressure inside the bearing chamber by a predetermined amount.

Thus, the present invention may provide a bearing arrangement including: a rolling element bearing assembly including a bearing cage having a cage body having an inner surface defining a bore coaxially aligned with the principal rotational axis of the bearing cage, a plurality of pockets, each pocket housing a rotatable rolling element of the rolling element bearing assembly, the pockets being arranged sequentially around the cage body with respect to the principal rotational axis of the bearing cage, and a skirt projecting from the cage body in the axial direction; a first body located in the bore of the bearing cage and coaxially aligned with the principal rotational axis of the bearing cage, and arranged to engage each of the rolling elements; a second body arranged circumferentially around the bearing cage to engage the rolling elements, the first and second bodies being rotatable with respect to one another about the principal rotational axis of the bearing cage; and a bearing chamber arranged to house the rolling element bearing assembly, the bearing chamber providing a seal configured to permit gas to flow into the chamber when the gas pressure on the external side of the seal exceeds the gas pressure inside the bearing chamber by a predetermined amount, wherein the seal is located adjacent the bearing cage in the axial direction (e.g. of the axis of the bore and/or of the principal rotational axis of the bearing cage); characterized in that the bearing cage includes a flow deflector projecting from the skirt in the radial direction, for deflecting the gas flow away from the cage body.

Preferably, the flow deflector intercepts the gas flow between the seal and the cage body. In other words, the flow deflector preferably lies on the flowpath of the incoming gas flow, between the seal and the bearing cage.

The flow deflector may be arranged to block the direct line of sight between the seal and the cage body.

The bearing chamber typically includes a chamber exit, and thus the flow deflector is preferably arranged to deflect the gas flow towards the chamber exit.

The chamber exit is preferably located radially outwards with respect to the flow deflector, e.g with respect to the principal axis of rotation of the bearing cage.

In a further aspect, the present invention provides a method of assembling a gas turbine engine including the step of incorporating a bearing cage or a bearing arrangement according to the teaching and disclosure herein into the gas turbine engine.

In yet another aspect the present invention provides a gas turbine engine including a bearing cage, or a bearing arrangement, according to the teaching and disclosure herein.

According to the present invention, the redirection of gas flow reduces the interaction between the gas flow from the seal and the flow of lubricant scavenged from the bearing. This improves the overall lubricant scavenge capability of the bearing, reducing the turbulence in the chamber and leading to a reduction in heat transfer to the lubricant in the chamber, meaning that the performance of the bearing is maintained at acceptable levels for longer periods.

Indeed, the redirection of gas flow at the extremities of the bearing cage wing can reduce the heat transferred to the bearing from the gas to the side of the cage, e.g. above the pilot surface (particularly, but not exclusively, in an inner piloted arrangement as shown in the figures). This reduces the increase in axial thermal gradient across the bearing typically suffered by prior art bearing cages, and thus reduces the risk of bearing cage coning which can cause dynamic cage instabilities.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
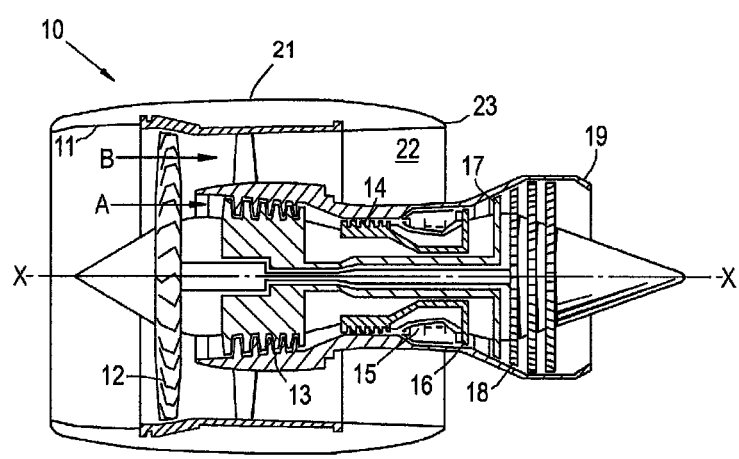
FIG. 1 shows an example of a ducted fan gas turbine engine incorporating the present invention.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
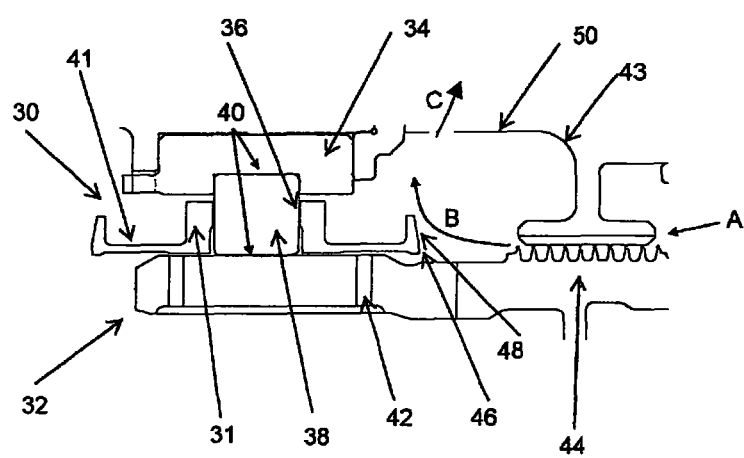
FIG. 2 shows an example of a bearing cage and bearing arrangement according to the present invention.

FIG. 2 shows an example of a bearing cage 30, according to an aspect of the present invention, incorporated into a gas turbine jet engine. FIG. 2 is a cross-section of a portion of such a gas turbine engine, and shows (only) the upper portion of a rotatable shaft 32 and (only) the upper portion of a (e.g. fixed) ring 34 arranged coaxially with the shaft 32. Likewise, only the upper portion of the bearing cage 30 is shown.

The principal axis of rotation of the bearing cage 30 is coaxially aligned with the axis of rotation of rotatable shaft 32. The principal axis of rotation of the bearing cage is the axis about which the bearing cage rotates in use.

The bearing cage 30 defines a bore in which the shaft 32 is located and rotatable. The ring 34 defines another bore in which the bearing cage 30 is located and rotatable. The axis of each bore is preferably coaxially aligned with the principal axis of rotation of the bearing cage 30.

The bearing 30 includes a main cage body 31, located in a central region of the bearing cage 30, in the axial direction.

A series of pockets 36 are arranged circumferentially around the main cage body 31. Each pocket 36 houses a rolling element 38, which is rotatable within the pocket 36. Rolling elements 38 may be spherical, e.g. ball bearings, or cylindrical, e.g. rollers. In the example shown, the rolling elements are cylindrical, and have an axis of rotation which is parallel to, but radially offset from, the principal axis of rotation of the bearing cage.

In addition to rotating about their own axis of rotation, the rolling bearing elements 38 typically rotate about the principal axis of rotation of the bearing cage 30, e.g. as the shaft 32 is rotated.

Rolling bearing elements 38 engage with the ring 34 and with the shaft 32, to bear the load between them, e.g. via bearing working contacts 40. Bearing working contacts 40 require lubrication, e.g. by lubricant delivered by oil holes 42. The lubricant can be degraded by overheating and/or by the introduction of debris or contaminants.

To help ensure that lubricant is scavenged efficiently from oil holes 42, cage wings 41 are provided. Cage wings 41 typically project from the main cage body 31 in the axial direction (i.e. in the direction of the principal axis of rotation of the bearing cage). Cage wings 41 typically extend circumferentially entirely around the principal axis of rotation of the bearing cage, e.g. to form a cylinder. The cage wings 41 typically provide an axial extension to the bore of the bearing cage.

A cage wing 41 (or skirt) may be provided with a weir to help encourage scavenged lubricant to flow towards the desired region, typically towards the bearing working contacts. An inner piloted bearing cage typically includes such a weir on its inner surface. An outer piloted bearing cage may include such a weir on its outer surface.

Typically, the bearing arrangement shown in FIG. 2 is housed within a bearing chamber 43. The bearing chamber 43 is not typically hermetically sealed from the surrounding environment, in other words it is not typically an airtight chamber.

For example, a non-airtight seal 44 may be provided between shaft 32 and the bearing chamber 43. The principal purpose of seal 44 is not to prevent gas flow in to the bearing chamber, but to prevent lubricant (oil) flow out of the bearing chamber 43. Thus, seal 44 may be a labyrinth seal, for example.

Seal 44 permits a flow of gas from outside the bearing chamber to pass through it into the bearing chamber, as shown by arrows A and B in FIG. 2. In use the pressure at A will be sufficiently greater than at B to ensure that oil is prevented from flowing out of the chamber 43 through seal 44.

However, a flow of gas from A to B introduces undesirable debris and/or contaminants into the bearing chamber 43. Furthermore, the gas flowing from A to B is of a high temperature and typically has a relatively high velocity, and can thus cause problems as discussed.

Indeed, due to the architecture of the bearing arrangement, the shaft 32 and the seal 44 are typically arranged such that the flow of gas is directed towards the bearing cage 30, and thus the bearing working contacts 40.

Thus, the present invention provides a flow deflector 46 arranged to deflect or re-direct the flow of gas, entering the bearing chamber via the seal, away from the bearing assembly; in particular away from the bearing working contacts.

Flow detector 46 projects from the cage wing 41 in the radial direction, to intercept the air flow and encourage it to flow radially outwards (away from the bearing) before it can enter the bearing.

The bearing chamber 43 preferably includes a chamber exit 50. Preferably, the flow deflector 46 re-directs the gas flow towards the chamber exit 50, as represented in FIG. 2 by arrow C. Preferably, therefore, the chamber exit 50 is arranged radially outwards of the bearing cage 30, and in particular radially outwards of the flow deflector 46.

The flow deflector is preferably an additional tang projecting from the cage wing 41 in the radial direction. Typically, the flow deflector 46 is an additional tang projecting from the outer perimeter (circumference) of the cage wing 41. The flow deflector 46 typically projects from the axial tip of the cage wing 41. The flow deflector 46 preferably extends around the entire circumference of the cage wing 41. Thus, in structural terms, the flow deflector 46 may be thought of as a lip or flange arranged circumferentially around the cage wing 41, e.g. at its axial extremity. These arrangements are preferred to minimize the additional mass contributed by the flow deflector 46.

Preferably, the flow deflector is located between the source of the gas flow (e.g. the seal in this example) and the bearing assembly, in particular the bearing working contacts 40. In some embodiments, where the gas flow is linear, the flow deflector 46 may therefore be located to block the direct line of sight between the source of the gas flow and the bearing assembly; in particular the bearing working contacts 40.

However, where the gas flow is not linear, the flow deflector may be arranged elsewhere to block the flowpath of the gas flow to prevent it reaching the bearing assembly; in particular the bearing working contacts.

The flow deflector 46 includes an outwardly facing face 48, suitably shaped to encourage the re-direction, or deflection, of the gas flow radially outwards before reaching the bearing assembly, and in particular the working contacts of the bearing assembly. For example, the face 48 may be angled, e.g. to project back towards the main cage body 31, to encourage such a re-direction.

The angle of face 48 with respect to the principal axis of rotation of the bearing cage 30 may vary dependent on the relative location of the gas flow source (e.g. the seal in this example) with respect to the bearing assembly (in particular with respect to the bearing working contacts 40) and/or the chamber exit. Likewise, the angle may vary depending on the pressure of the gas flow.

The extent of projection of the flow deflector 46 in the radial direction may also vary dependent on the same factors.

If the surrounding architecture permits, then a relatively large flow deflector is preferable, so as to block as much as possible of the flowpath between the source of the gas flow and the bearing assembly; in particular the bearing working contacts.

A simple configuration of a flow detector 46 according to the present invention comprises a planar face 48 formed circumferentially around the cage wing 41 to project in the radial direction therefrom. The face may be orthogonal to the principal axis of rotation of the bearing cage. Preferably, however, it is angled back towards the main cage body 31. The face 48 may be considered to be chamfered or bevelled.

In a cross-section taken parallel to the principal axis of rotation of the bearing cage 30, this chamfer or bevel would be represented by a straight line which is positioned at an angle between the source of gas flow (e.g. the seal in this example) and the bearing assembly.

However, a simple chamfer or bevel may be replaced with compound angles and/or curves, for example to provide a smooth re-direction or deflection of the gas flow. This might be desirable to minimise the risk of turbulent gas flow and the associated heat generation in the bearing chamber, to avoid the aforementioned problems.

Figure 3:
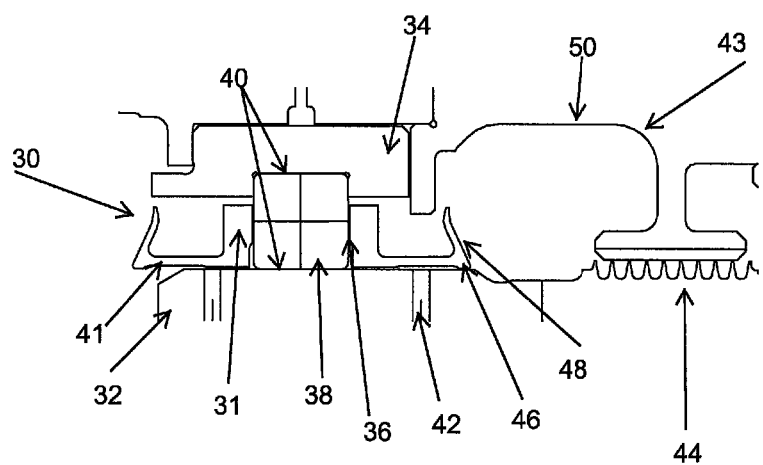
FIG. 3 shows an example of another bearing cage and bearing arrangement according to the present invention.

A representation of a compound angle and curved cage debris deflector is shown in FIG. 3. The face 48 may be formed of one or more compound angles, such that the face actively re-directs the gas flow away from the bearing assembly (in particular the bearing working contacts 40) not only in the radial direction by also in the axial direction. This may also be achieved by curving the face 48 away from the cage main body, towards the radial extremity of the face 48. Thus, an intermediate region of the face 48 (in the radial direction) may define an annulus which is closer to the cage main body 31, in the axial direction, than radially inner and outer regions of the face 48.

The axial distance from the central region of the bearing cage to the face(s) 48 of the flow deflector(s) 46 is typically selected to ensure that the scavenge route of the lubricant from the bearing is not adversely affected. The scavenge route must maintain sufficient area to pass all of the lubricant from the bearing assembly without causing a choke point, or choke region, that would otherwise restrict the flow of lubricant and potentially lead to flooding of the bearing. From a known volume of lubricant supplied to the bearing assembly, the required scavenge area can be calculated by the skilled person using standard fluid dynamics theory.

Only a single cage wing, rather than a pair as shown in FIGS. 2 and 3, may be provided in certain arrangements. This may be due to limitations imposed by the surrounding architecture for example. Thus, only a single flow deflector 46 may be provided. Such an arrangement may also be preferred where only a single seal is provided in the bearing chamber, and thus only a single flow deflector is considered necessary.

The additional material added to the cage wing(s) by virtue of the flow deflector(s) provides additional stiffness to the cage wing(s) which reduces the (undesirable) growth of the wing tip during operation. This effectively helps to maintain the structure of cage wing and hence provides an improved efficiency of oil use in the bearing.

Although a flow detector may be provided for each cage wing 41, it is also envisaged that a cage bearing having a pair of cage wings 41 may be provided with only a single flow deflector 46, i.e. projecting from only one of the cage wings 41. This may be due to limitations imposed by the surrounding architecture for example. Such an arrangement may also be preferred where only a single seal is provided in the bearing chamber, and thus only a single flow deflector is considered necessary.

It is to be understood that although the flow deflector is said to project from the skirt in the radial direction, it is not intended that the invention be interpreted to be limited to flow deflectors which only extend radially, i.e. which extend parallel to the radii. Rather, it is to be understood that the flow deflectors project from the skirt such that they extend away from, or towards, the axis of the skirt (and therefore the bore), even though they may extend at an angle to the axis.

It is also to be understood that, although the term bore has been used herein, methods other than boring could be used to form the bore, for example, machining other than boring, moulding, casting, etching, laser cutting, etc. could be used to form a bearing cage having an inner surface defining a bore. The term lumen could be used in place of bore.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An annular bearing arrangement configured for providing free rotation between two coaxially aligned bodies between which the bearing arrangement is coaxially aligned, the bearing arrangement including:
  a bearing chamber having a gas inlet and a lubricant inlet and arranged to house a rolling element bearing assembly,
  the rolling element bearing assembly including a bearing cage having a cage body close to or in axial alignment with the gas inlet and having an inner surface defining a bore coaxially aligned with the principal rotational axis of the bearing cage, a plurality of pockets, each pocket housing a rotatable rolling element of the rolling element bearing assembly, the pockets being arranged sequentially around the cage body with respect to the principal rotational axis of the bearing cage, and a skirt projecting from the cage body in the axial direction and past the lubricant inlet, wherein:

the bearing cage includes a flow deflector projecting from the skirt in the radial direction at an axial position which is between the lubricant inlet and the gas inlet and which is arranged to intercept gas flow entering by the gas inlet so as to deflect the gas flow away from the cage body.

2. The bearing arrangement according to claim 1, wherein the flow deflector is arranged to block the direct line of sight between the source and the cage body.

3. The bearing arrangement according to claim 1, wherein the source of gas flow is a seal provided to seal the bearing chamber.

4. The bearing arrangement according to claim 3, wherein the seal is configured to permit gas to flow into the bearing chamber when the gas pressure on the external side of the seal exceeds the gas pressure inside the bearing chamber by a predetermined amount.

5. The bearing arrangement according to claim 1, further including an additional skirt projecting from the cage body in an opposite axial direction to the skirt, a respective flow deflector projecting from each skirt in the radial direction.

6. The bearing arrangement according to claim 5, wherein the each flow deflector projects radially outwardly from the principal rotational axis of the bearing cage.

7. The bearing arrangement according to claim 1, wherein the flow deflector includes an outwardly facing deflector face, the deflector face being shaped, along its extent of projection in the radial direction, to extend in the axial direction towards the cage body.

8. The bearing arrangement according to claim 7, wherein the deflector face, along its extent of projection in the radial direction, is formed to include one or more compound angles.

9. The bearing arrangement according to claim 7, wherein the deflector face is curved along at least a portion of its extent of projection in the radial direction.

10. The bearing arrangement according to claim 7, wherein the deflector face is curved along at least a portion of its extent of projection in the radial direction, such that the closest region of the deflector face to the cage body is formed in an intermediate region along the extent of projection in the radial direction of the deflector face.

11. The bearing arrangement according to claim 1, wherein the skirt extends circumferentially entirely around the principal rotational axis of the bearing cage.

12. The bearing arrangement according to claim 1, wherein the flow deflector extends circumferentially entirely around a respective skirt.

13. The bearing arrangement according to claim 1, wherein the bearing chamber includes a chamber exit, and the flow deflector is arranged to deflect the gas flow towards the chamber exit.

14. The bearing arrangement according to claim 13, wherein the chamber exit is located radially outwards of the flow deflector with respect to the principal axis of rotation of the bearing cage.

* * * * *